(12) United States Patent
He et al.

(10) Patent No.: US 10,647,530 B2
(45) Date of Patent: May 12, 2020

(54) CONTAINER TERMINAL, CONTAINER LOADING-UNLOADING METHOD AND CONTAINER COLLECTION- EVACUATION METHOD

(71) Applicant: Shanghai Zhenhua Heavy Industries Co., Ltd., Shanghai (CN)

(72) Inventors: Gang He, Shanghai (CN); Yaozhou Zhang, Shanghai (CN); Jian Xia, Shanghai (CN); Jianming Jin, Shanghai (CN); Yan Liang, Shanghai (CN); Siming Shi, Shanghai (CN); Qi Lu, Shanghai (CN)

(73) Assignee: Shanghai Zhenhua Heavy Industries Co., Ltd., Shanghai (CN)

( * ) Notice: Subject to any disclaimer, the term of this patent is extended or adjusted under 35 U.S.C. 154(b) by 0 days.

(21) Appl. No.: 16/065,678

(22) PCT Filed: Apr. 22, 2016

(86) PCT No.: PCT/CN2016/079967
§ 371 (c)(1),
(2) Date: Jun. 22, 2018

(87) PCT Pub. No.: WO2017/107350
PCT Pub. Date: Jun. 29, 2017

(65) Prior Publication Data
US 2019/0016545 A1    Jan. 17, 2019

(30) Foreign Application Priority Data
Dec. 25, 2015    (CN) .......................... 2015 1 0992788

(51) Int. Cl.
*B65G 63/00*    (2006.01)
*B63B 25/00*    (2006.01)
(Continued)

(52) U.S. Cl.
CPC .......... *B65G 63/004* (2013.01); *B63B 25/004* (2013.01); *B65G 35/06* (2013.01);
(Continued)

(58) Field of Classification Search
CPC .... B65G 63/004; B65G 35/06; B65G 67/603; B65G 2201/0235; B63B 25/004; B66C 19/007
(Continued)

(56) References Cited

U.S. PATENT DOCUMENTS

| 2008/0213067 A1* | 9/2008 | Jegers | B65G 1/0478 |
| | | | 414/139.4 |
| 2014/0079513 A1* | 3/2014 | Kasai | B65G 63/004 |
| | | | 414/139.4 |

FOREIGN PATENT DOCUMENTS

| CN | 1781830 A | 6/2006 |
| CN | 1872643 A | 12/2006 |

(Continued)

OTHER PUBLICATIONS

Appendix US 16065678 Annotated Drawing (Year: 2016).*
(Continued)

*Primary Examiner* — Lynn E Schwenning
(74) *Attorney, Agent, or Firm* — Osha Liang LLP

(57) ABSTRACT

A container terminal includes a shore working area, loading-unloading passages, a yard area and collection-evacuation passages. The shore working area is arranged on the shore, and a ship is docked at the shore. The yard area comprises a plurality of yard units. Spacing areas are formed between adjacent yard units. Each yard unit comprises at least one yard. Each yard unit is arranged with a collection-evacuation passage surrounding the yard. Loading-unloading passages are arranged in the spacing areas between adjacent yard units. The loading-unloading passages connect the yard area
(Continued)

and the shore working area. The collection-evacuation passages are arranged in the yard units. The loading-unloading passages and the collection-evacuation passages are in a same horizontal plane but do not intersect with each other.

9 Claims, 6 Drawing Sheets

(51) Int. Cl.
  *B65G 35/06* (2006.01)
  *B65G 67/60* (2006.01)
  *B66C 19/00* (2006.01)
(52) U.S. Cl.
  CPC .......... *B65G 67/603* (2013.01); *B66C 19/007* (2013.01); *B65G 2201/0235* (2013.01)
(58) Field of Classification Search
  USPC ...................................................... 414/139.4
  See application file for complete search history.

(56) References Cited

FOREIGN PATENT DOCUMENTS

| CN | 104108610 A | 10/2014 | |
|---|---|---|---|
| CN | 104108611 A | 10/2014 | |
| CN | 104986581 A | 10/2015 | |
| CN | 105059955 A | 11/2015 | |
| CN | 105417190 A | 3/2016 | |
| JP | H1053335 A | 2/1998 | |
| JP | H10-139169 A | 5/1998 | |
| JP | 2003048625 * | 2/2003 | ............. B65G 63/00 |
| JP | 2003048625 A | 2/2003 | |
| JP | 2003-292168 A | 10/2003 | |
| JP | 2004-203622 A | 7/2004 | |
| JP | 2006282386 A | 10/2006 | |
| JP | 2007223782 A | 9/2007 | |
| JP | 2011-0093654 A | 5/2011 | |
| KR | 20150131989 A | 11/2015 | |

OTHER PUBLICATIONS

Appendix JP 200348625 Annotated Drawing (Year: 2003).*
Office Action issued in corresponding Singaporean Application No. 11201805408 dated Oct. 30, 2018 (8 pages).
International Search Report issued in PCT/CN2016/079967 dated Sep. 13, 2016 (6 pages).
Written Opinion issued in PCT/CN2016/079967 dated Sep. 13, 2016 (4 pages).
Office Action issued in corresponding Chinese Application No. 201510992788.3 dated Apr. 21, 2017 (9 pages).

* cited by examiner

CONTAINER TERMINAL, CONTAINER LOADING-UNLOADING METHOD AND CONTAINER COLLECTION- EVACUATION METHOD

BACKGROUND OF THE INVENTION

1. Field of the Invention

The present invention relates to container loading-unloading technology for container terminals, and more particularly, relates to a container terminal arrangement scheme and corresponding container loading-unloading and collection-evacuation methods.

2. The Related Art

A container terminal is generally provided with yards. A container operation process at the container terminal generally includes two parts: a loading-unloading process between the yards and a ship, and a collection-evacuation process between the yards and external areas.

In the loading-unloading process between the yards and the ship, horizontal transportation vehicles transport containers between the yards and a shore working area. Shore operation equipments, such as shore cranes, perform loading-unloading operations with the ship in the shore working area. And yard operation equipments, such as yard cranes, stack containers into the yards or extract containers from the yards.

In the collection-evacuation process between the yards and external areas, yard operation equipments, such as yard cranes, stack containers into the yards or extract containers from the yards. And horizontal transportation vehicles transport containers into the yards or out of the yards.

In the shore working area, a ship-side loading-unloading manner is widely adopted, that is, the shore operation equipment is operated on the side of the ship, then the length of the ship is fully utilized, which provides a high working efficiency. In a yard operation area, there are two kinds of operation manners: one is a yard-end operation manner. A yard crane is arranged at the end of the yard and performs loading-unloading operations with the horizontal transport equipments. According to this manner, only up to two yard cranes can be arranged in each yard. Because the number of ends of the yard is limited, working positions are limited and the number of yard cranes cannot be increased. Moreover, the yard crane needs to carry the container and move to the end of the yard along a longitudinal direction of the yard. Due to the large quality, the slow movement speed and the high energy consumption of the yard crane, it is inefficient and costly to use the yard crane to carry the containers. Based on the above reasons, the yard-end operation manner is only used in some automated terminals. The other manner is a yard-side operation manner. Horizontal transportation vehicles travel to the side of the yard. The yard crane does not need to move along longitudinal direction of the yard, only a trolley of the yard crane needs to move along a transverse direction of the yard to transport containers. The trolley has a high speed and low energy consumption. In addition, in the yard-side operation manner, a plurality of yard cranes may be arranged in parallel, which will greatly improve the operation efficiency. Therefore, the yard-side operation manner is the majority of container terminal operation manners.

However, the yard-side operation manner also has a problem, that is, path crossing of horizontal transportation vehicles. Horizontal transportation vehicles are used to transport containers in both the loading-unloading process between the yards and the ship and the collection-evacuation process between the yards and external areas. According to the yard-end operation manner, the horizontal transportation vehicles for loading-unloading process and the horizontal transportation vehicles for collection-evacuation process work on different ends of the yard and their paths do not intersect. According to the yard-side operation manner, the horizontal transportation vehicles for both processes will enter into the yard area and travel to the side of the yard. As a result, the travel paths of these horizontal transportation vehicles may intersect, which will cause congestion, interruption of processes and affecting the working efficiency.

According to the prior art, several solutions have been proposed to avoid the problems caused by the path crossing:

Chinese patent application CN104986581 proposes an automatic container wharf handling system for right-angled shoreline multi-berth arrangement. The system is composed of a shore crane, a straddle carrier, an ARMG and an overhead travelling crane subsystem. The overhead travelling crane subsystem is composed of a viaduct and an overhead travelling crane. The shore crane is arranged on the front edge of a front face berth and the front edge of a side face berth. The shore crane is used for perpendicularly and horizontally transporting containers from a container ship to a shoreside working area. An ARMG track of a container yard is arranged perpendicular to the front berth shoreline. The area, closely adjacent to the front face berth end, of the container yard is the front face berth end of the yard. The area, closely adjacent to a rear collecting and distributing channel, of the container yard is a yard land side end. The area, closely adjacent to the side face berth end of the yard, of the container yard is the side face berth end of the yard.

The Chinese patent application CN1872643 discloses a container terminal arrangement scheme for a container terminal in which the containers in the yards are arranged in a direction perpendicular to the direction of the containers on the ship. The scheme includes: shore cranes, the container to be loaded and unloaded is always in a first direction; a low bridge system including a low bridge track along the first direction, a low bridge lifting trolley and a low bridge flat trolley, the low bridge lifting trolley may be used for loading and unloading containers with the low bridge flat trolley, and the low-bridge system may be loaded and unloaded by the shore crane; a transfer trolley system including a transfer trolley rail along a second direction and a transfer trolley, the transfer trolley can make a loaded container rotate 90°, the transfer trolley system may be loaded and unloaded by the low bridge system; a yard crane with a yard crane rail along the second direction, the yard crane can load and unload containers with the transfer trolley system.

Chinese patent application CN105059955 discloses a loading and unloading system for a distribution center type automated container terminal. The loading and unloading system comprises a plurality of shore cranes, a nearshore multipath rectangular-ambulatory-plane automatic transportation system, an elevated container automatic loading and unloading system, a yard, a container evacuating port side multipath rectangular-ambulatory-plane automatic transportation system, a container evacuating port transportation system, an annular special container channel and a control system.

The several solutions mentioned above all adopt different transportation planes with different heights, viaducts or low bridges are set up to allow different transport vehicles to transport on different planes so as to avoid intersections in transportation paths. Although the solutions with different levels of transportation planes can well solve the problem of intersection of paths, the cost of building viaducts is relatively high and will greatly limit the expansion of the terminal. If the yard area or shoreline expands, the viaduct needs to be rebuilt or it will not be able to adapt to the new working area.

SUMMARY

The invention provides a layout schema of a container terminal and corresponding container loading-unloading and collection-evacuation methods. Loading-unloading transportation vehicles and collection-evacuation vehicles are still arranged in a same horizontal plane but their running paths are separated and do not intersect each other.

According to an embodiment of the present invention, a container terminal is disclosed. The container terminal comprises a shore working area, loading-unloading passages, a yard area and collection-evacuation passages. Shore operation equipments are arranged in the shore working area. Yard operation equipments are arranged in the yard area. Loading-unloading transportation vehicles run on the loading-unloading passages and collection-evacuation vehicles run on the collection-evacuation passages. The shore operation equipments perform loading-unloading operations of containers with a ship. The loading-unloading transportation vehicles transport the containers between the shore working area and the yard area. The collection-evacuation vehicles perform collection or evacuation transportations for the containers disposed in the yard area. The shore working area is arranged on the shore and a ship is docked at the shore. The yard area comprises a plurality of yard units, spacing areas are formed between adjacent yard units. Each yard unit comprises at least one yard, each yard unit is arranged with a collection-evacuation passage surrounding the yard. Loading-unloading passages are arranged in the spacing areas between adjacent yard units. The loading-unloading passages connect the yard area and the shore working area. The collection-evacuation passages are arranged in the yard units. The loading-unloading passages and the collection-evacuation passages are in a same horizontal plane but do not intersect with each other.

According to an embodiment, each yard unit comprises a yard. The collection-evacuation passage comprises a plurality of collection-evacuation passage units. Each collection-evacuation passage unit is U-shaped, each collection-evacuation passage unit is arranged in one yard unit and surrounds the yard. The collection-evacuation passage unit occupies both side areas of the yard, and a first end area of the yard.

According to an embodiment, each yard unit comprises a first yard and a second yard arranged with an interval. The collection-evacuation passage comprises a plurality of collection-evacuation passage units. Each collection-evacuation passage unit is U-shaped, each collection-evacuation passage unit is arranged in one yard unit and surrounds the first yard. The collection-evacuation passage unit occupies the interval between the first yard and the second yard, a first end area of the first yard, and an area within the yard unit and being a part of the side area of the first yard opposite to the second yard.

According to an embodiment, each yard unit comprises a first yard and a second yard arranged with an interval. The collection-evacuation passage comprises a plurality of collection-evacuation passage units. Each collection-evacuation passage unit is U-shaped, two collection-evacuation passage units are arranged in each yard unit and surround the first yard and the second yard respectively. The collection-evacuation passage unit surrounding the first yard occupies a part of the interval between the first yard and the second yard, a first end area of the first yard, and an area within the yard unit and being a part of the side area of the first yard opposite to the second yard. The collection-evacuation passage unit surrounding the second yard occupies a part of the interval between the first yard and the second yard, a first end area of the second yard, and an area within the yard unit and being a part of the side area of the second yard opposite to the first yard.

According to an embodiment, the loading-unloading passage comprises a plurality of on-site loading-unloading passages and connection loading-unloading passages. The connection loading-unloading passages are arranged between the yard area and the shore working area. The on-site loading-unloading passages are arranged in the spacing areas between adjacent yard units, but do not enter into a single yard unit.

According to an embodiment, each yard operation equipment serves one yard, and an operation range of each yard operation equipment at least covers: the yard which is served, the nearest collection-evacuation passage unit, and the nearest on-site loading-unloading passage.

According to an embodiment, the shore working area comprises shore loading-unloading passages, the shore loading-unloading passages are located below landside operation areas of the shore operation equipments. The connection loading-unloading passage comprises a first connection loading-unloading passage and a second connection loading-unloading passage. The plurality of on-site loading-unloading passages are connected with the first connection loading-unloading passage. The second connection loading-unloading passage connects the first connection loading-unloading passage and the shore loading-unloading passage.

According to an embodiment, the direction of the yard area and the yard units therein is at an angle to the shore, and the angle is between 0 and 180 degrees.

According to an embodiment of the present invention, a container loading method is disclosed. The container loading method is used for loading a container from a yard area to a ship on a container terminal as described above, the method comprises:
  transporting, by a yard operation equipment, a container from the yard area to a loading-unloading transportation vehicle on an on-site loading-unloading passage in the yard area;
  the loading-unloading transportation vehicle running along an on-site loading-unloading passage, a connection loading-unloading passage and arriving a shore loading-unloading passage, wherein the loading-unloading transportation vehicle never enters into a collection-evacuation passage;
  loading, by a shore operation equipment, the container from the loading-unloading transportation vehicle to the ship.

According to an embodiment, a container unloading method is disclosed. The container unloading method is used for unloading a container from a ship to a yard area on a container terminal as described above, the method comprises:
  unloading, by a shore operation equipment, a container from the ship to a loading-unloading transportation vehicle;
  the loading-unloading transportation vehicle running along a shore loading-unloading passage, a connection loading-unloading passage and arriving an on-site loading-unloading passage, wherein the loading-unloading transportation vehicle never enters into a collection-evacuation passage;

stacking, by a yard operation equipment, the container from the loading-unloading transportation vehicle to the yard area.

According to an embodiment, a container evacuation method is disclosed. The container evacuation method is used for evacuating a container from a yard area on a container terminal as described above, the method comprises:

transporting, by a yard operation equipment, a container from the yard area to a collection-evacuation vehicle on a collection-evacuation passage;

the collection-evacuation vehicle running away from the yard area along the collection-evacuation passage, wherein the collection-evacuation vehicle never enters into a loading-unloading passage According to an embodiment, a container collection method is disclosed. The container collection method is used for collecting a container to a yard area on a container terminal as described above. The method comprises:

a collection-evacuation vehicle running to the yard area along a collection-evacuation passage, wherein the collection-evacuation vehicle never enters into a loading-unloading passage;

stacking, by a yard operation equipment, the container from the collection-evacuation vehicle to the yard area.

The container terminal, the container loading-unloading method and the container collection-evacuation method of the present invention still arrange the loading-unloading transportation vehicles and the collection-evacuation vehicles in a same horizontal plane, but their running paths are separated and will not intersect each other during running processes. According to the present invention, it is not required to construct viaducts, so it has a lower cost and a better scalability.

BRIEF DESCRIPTION OF THE DRAWINGS

The above and other features, natures, and advantages of the invention will be apparent by the following description of the embodiments incorporating the drawings, wherein.

DETAILED DESCRIPTION OF EMBODIMENTS

Figure 1:
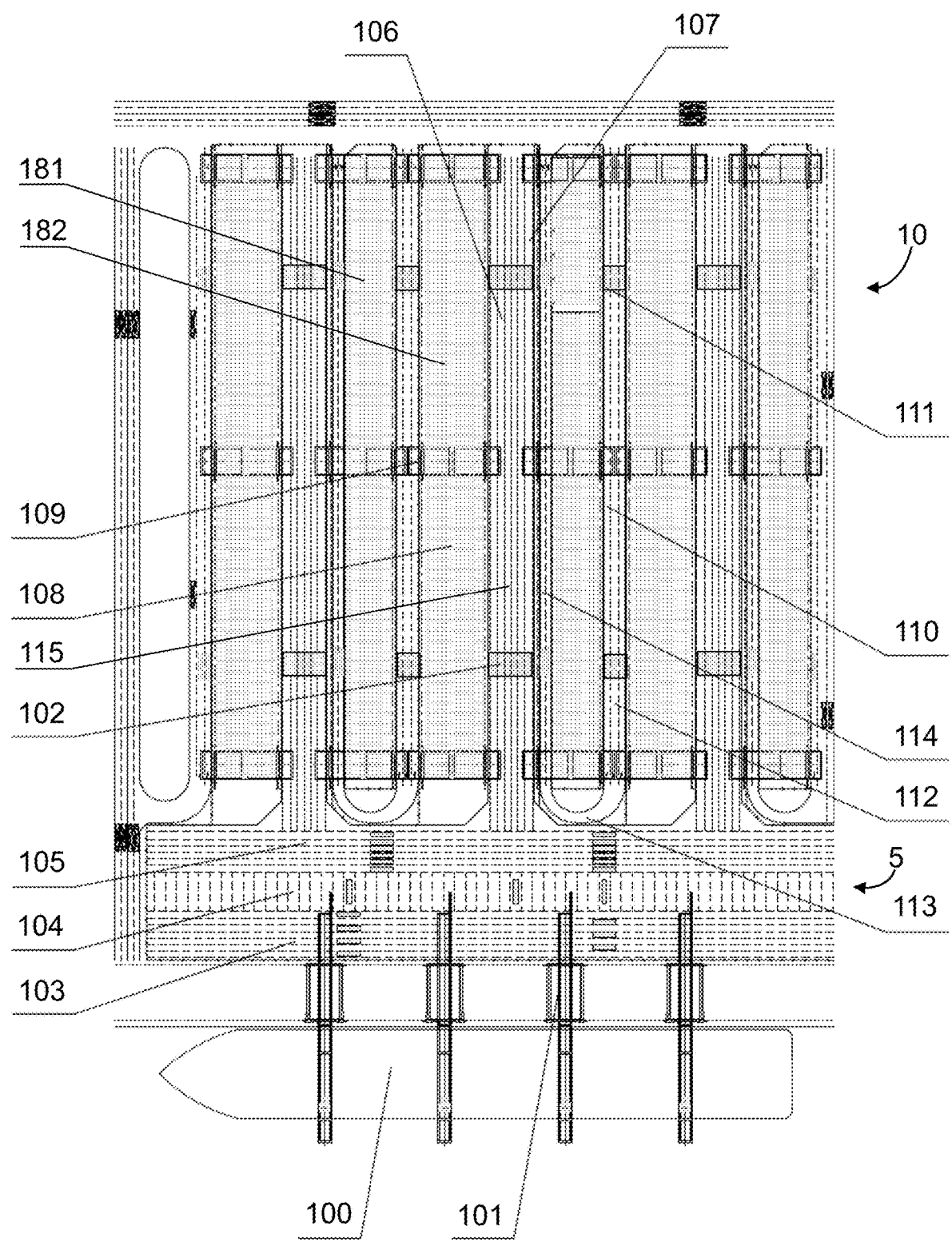
FIG. 1 illustrates a schematic diagram of a specific implementation of an arrangement of a container terminal according to an embodiment of the present invention.

Referring to FIG. 1, FIG. 1 illustrates a schematic diagram of a specific implementation of an arrangement of a container terminal according to an embodiment of the present invention. As illustrated in the figures, the container terminal comprises a shore working area, loading-unloading passages, a yard area and collection-evacuation passages. Shore operation equipments 101 are arranged in the shore working area. Yard operation equipments 109 are arranged in the yard area 10. Loading-unloading transportation vehicles 102 run on the loading-unloading passages and collection-evacuation vehicles 111 run on the collection-evacuation passages. The shore operation equipments 101 perform loading-unloading operations of containers with a ship. The loading-unloading transportation vehicles 102 transport the containers between the shore working area 5 and the yard area 10. The collection-evacuation vehicles 111 perform collection or evacuation transportations for the containers disposed in the yard area. Here the loading-unloading passage is defined as a passage for ship container operation and transition. That is, the loading-unloading passage is a passage connecting the shore working area and the yard area. The collection-evacuation passage is defined as a passage for an off-site container transportation vehicle to collect the container to the yard area or evacuate the container from the yard area. That is, the loading-unloading passage is a passage connecting the yard area and external roads of the container terminal.

The shore working area is arranged on the shore. Generally, the shore working area is arranged along a direction parallel to the shore. A ship 100 is docked along the direction parallel to the shore. A side of the ship 100 is docked at the shore. The shore operation equipment 101 is a shore crane. A plurality of shore cranes may be arranged along the side of the ship 100 to operate simultaneously. The shore crane operates on the side of the ship 100. The direction of a girder of the shore crane is perpendicular to the direction of the shore. A shore loading-unloading passage 103 is located below a landside operation area of the shore operation equipment 101, that is, the shore crane. The shore loading-unloading passage 103 is arranged in the shore working area. Generally, the shore loading-unloading passage 103 is also along the direction of the shore, and the shore loading-unloading passage 103 may include a plurality of parallel passages.

The yard area comprises a plurality of yard units 108. According to the specific implementation of the arrangement shown in FIG. 1, the direction of the yard is perpendicular to the direction of the shore. This is a common manner for yard arrangement. Of course, the present invention is not limited to the arrangement that the yard is perpendicular to the shore, which will be described later. As shown, a plurality of yard units 108 are arranged in a direction perpendicular to the shore, and the plurality of yard units 108 form the yard area. For the convenience of the following description, the concept of the "yard unit" is defined here. The yard unit is a virtual concept including a yard and some areas around the yard. The area around the yard will be used as passages, mainly as collection-evacuation passages. The purpose of defining the concept of "yard unit" here is to embody the design that the collection-evacuation passages and the loading-unloading passages do not intersect with each other. Back to FIG. 1, according to FIG. 1, the yard unit 108 is defined as follows: each yard unit 108 includes a first yard 181, a second yard 182, an interval between the first yard and the second yard, and an area being a part of the side area adjacent to the other side of the first yard 181. According to FIG. 1, a part of the area on the left side of the first yard 181 is also included in the range of the yard unit 108, for the purpose of facilitating the description and facilitating the understanding of the arrangement of the present invention. Again, the yard unit 108 is a virtual concept. In an actual yard scheme, it is not necessary to have physical boundaries. The yard unit 108 is defined here to more clearly describe the arrangement and direction of the loading-unloading passages and the collection-evacuation passages.

After the definition of the yard unit 108, continue with FIG. 1. There is a spacing area 106 between adjacent yard units. Each yard unit 108 includes a first yard 181 and a second yard 182 arranged with an interval. An interval 110 is provided between the first yard and the second yard in each yard unit.

The collection-evacuation passages are mainly arranged within each yard unit 108, and do not enter into the spacing areas 106 between adjacent yard units. From a perspective of the entire yard area 10, the collection-evacuation passages enter into or exit from the yard area at the landside of the yard area. According to FIG. 1, the collection-evacuation passages enter into or exit from the yard area at the top of the yard area. The loading-unloading passages are mainly arranged in the spacing areas 106 between the yard units, and do not enter into each yard unit 108. From a perspective of the entire yard unit, the loading-unloading passages enter into or exit from the yard area at the seaside of the yard area. According to FIG. 1, the loading-unloading passages enter into or exit from the yard area at the bottom of the yard area. In this way, although the collection-evacuation passages and the loading-unloading passages are arranged on a same horizontal plane, that is, the ground plane, their paths are separated from each other and do not intersect with each other. The loading-unloading passages connect the yard area and the shore working area, the collection-evacuation passages are arranged in the yard area, the loading-unloading passages and the collection-evacuation passages are in a same horizontal plane but do not intersect with each other. Loading-unloading transportation vehicles and collection-evacuation vehicles run on the loading-unloading passages and the collection-evacuation passages respectively and will not interfere with each other. According to an embodiment, in an area where the loading-unloading passage and the collection-evacuation passage are adjacent, for example the area on the left side of the first yard 181 in each yard unit 108, a physical isolation device may be provided to separate the loading-unloading passage and the collection-evacuation passage.

Continue with FIG. 1, according to the embodiment shown in FIG. 1, the collection-evacuation passage comprises a plurality of collection-evacuation passage units. Each collection-evacuation passage unit is arranged in one yard unit 108. The collection-evacuation passage unit is U-shaped and surrounds the first yard 181. The collection-evacuation passage unit occupies the entire interval 110 between the first yard and the second yard, a seaside end area of the first yard 181, and an area within the yard unit and being a part of the side area of the first yard opposite to the second yard. Here, since the direction of the yard is perpendicular to the shore, the ends of the yard can be defined as the landside end and the seaside end. However, if the direction of the yard is not perpendicular to the shore, it is not suitable to use the landside end and the seaside end to define the ends of the yard. Therefore, a more general description of the region at the seaside end of the first yard 181 is the region of the first end of the yard (the first end in FIG. 1 is the seaside end). Specifically, each collection-evacuation passage unit includes three sections: a first section 112, a second section 113, and a third section 114. The first section 112 occupies the entire interval 110 between the first yard and the second yard. The first section 112 may include several parallel passages (all along the second direction). The passage close to the yard may be set as a working position for loading-unloading containers, and the passage farther from the yard may be used as a roadway. The second section 113 is located in the area of the seaside end of the first yard 181. According to the embodiment shown in FIG. 1, the second section 113 is substantially arc-shaped. The third section 114 is located in an area within the yard unit 108 and being a part of the side area of the first yard 181 opposite to the second yard. According to the illustrated embodiment, the third section 114 is located in a partial area on the left side of the first yard 181, and is within each yard unit 108. The third section 114 is adjacent to the spacing area 106 between the yard units, that is, the third section 114 is adjacent to the loading-unloading passage. Therefore, in an actual arrangement scheme, the third section 114 may be provided with isolation devices at positions adjacent to the loading-unloading passage, so that the loading-unloading passage and the collection-evacuation passage can be separated. The loading-unloading passage and the collection-evacuation passage are only adjacent in this area and are significantly separated in other locations. The above-described first section 112, second section 113, and third section 114 collectively form a U-shaped collection-evacuation passage of the first yard 181. The collection-evacuation passage is closed at the seaside of the yard by the second section, and the collection-evacuation passage is open at the landside of the yard. Therefore, the collection-evacuation passage enters into or exits from the yard at the landside.

The loading-unloading passage comprises a plurality of on-site loading-unloading passages 115 and connection loading-unloading passages. The on-site loading-unloading passages 115 are arranged in the intervals 106 between adjacent yard units, but do not enter into a single yard unit 108. It should be noticed again that, the yard unit 108 in this disclosure is a virtual concept. According to the definition of the yard unit 108 defined above, an area between the right side of each second yard 182 and the left side of another first yard 181 is divided into two parts: one part belongs to the spacing area 106 between the yard units, and the other part belongs to the yard unit 108. Then, the positions of the loading-unloading passage and the collection-evacuation passage can be clearly defined, and the solution of the isolated arrangement of the present invention is made clear. Back to FIG. 1, in on-site loading-unloading passages 115, a passage close to the yard may be set as a working position for loading-unloading containers, and a passage farther from the yard may be used as a roadway. The on-site loading-unloading passages 115 are adjacent to the third section 114 of the collection-evacuation passage, so isolation devices may be provided between the on-site loading-unloading passages 115 and the third section 114. The connection loading-unloading passages are arranged between the yard area and the shore working area, but do not enter into the yard area nor the shore working area. According to the embodiment shown in FIG. 1, the connection loading-unloading passage comprises a first connection loading-unloading passage 105 which is parallel to the shore and a second connection loading-unloading passage 104 which is perpendicular to the shore. The first connection loading-unloading passage 105 includes a plurality of passages arranged in parallel. The plurality of on-site loading-unloading passages 115 are connected with the first connection loading-unloading passage 105. As shown in FIG. 1, the first connection loading-unloading passage 105 is arranged at the seaside end of the yard, and the position of the first connection loading-unloading passage is at a certain distance from the seaside end of the yard. Therefore the first connection loading-unloading passage 105 is significantly separated from the second section 113 (the arc-shaped section) of the collection-evacuation passage and will not interfere each other. Correspondingly, the on-site loading-unloading passages 115 will extend toward the seaside for a distance to connect with the first connection loading-unloading passage 105. The second connection loading-unloading passage 104 is along the second direction, and connects the first connection loading-unloading passage 105 and shore loading-unloading passages 103 in the shore working area.

For each yard, including the first yard 181 and the second yard 182, at least one yard operation equipment 109, such as a yard crane is provided. Each yard operation equipment 109 serves one first yard or one second yard. An operation range of each yard operation equipment at least covers: the first yard 181 or the second yard 182 which is served by the yard operation equipment, the nearest collection-evacuation passage unit, and the nearest on-site loading-unloading passage. More specifically, the yard operation equipment needs to cover the working position of the first section in the collection-evacuation passage unit, and the working position of the on-site loading-unloading passages.

FIG. 2 to FIG. 6 illustrate variations of the arrangement of the container terminal according to the present invention. The embodiments shown in FIG. 2 to FIG. 6 adopt a simplified manner, which mainly embodies the main idea of the arrangement of the present invention.

Figure 2:
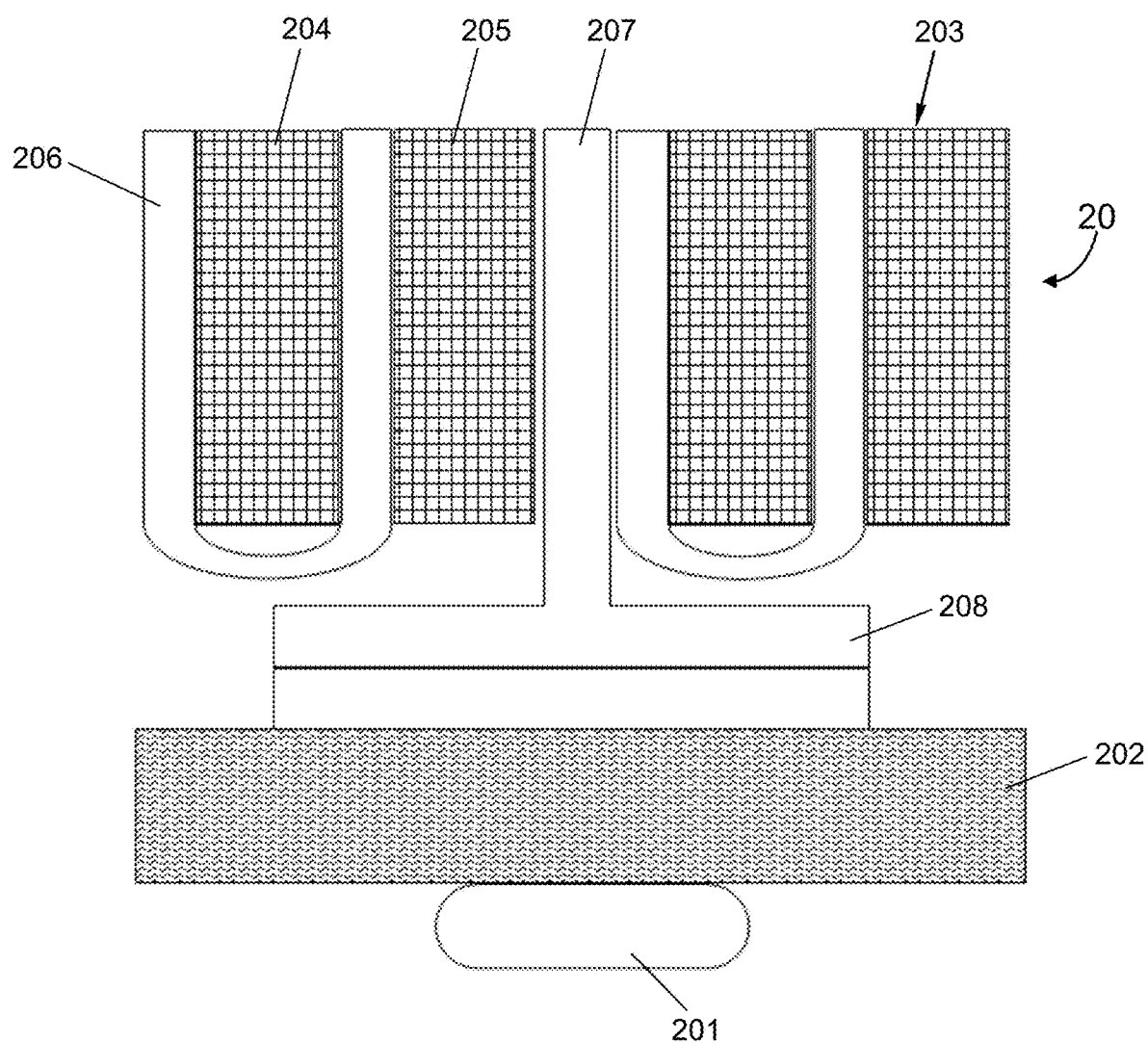
FIG. 2 discloses a schematic diagram of an arrangement of a container terminal according to a first embodiment of the present invention.

With reference to FIG. 2, FIG. 2 discloses a schematic diagram of an arrangement of a container terminal according to a first embodiment of the present invention. The first embodiment shown in FIG. 2 is a schematic diagram of the specific implementation shown in FIG. 1. As shown in FIG. 2, according to the first embodiment, the shore working area 202 is arranged along the shore and a ship 201 is docked at the shore. The direction of the yard area 20 is perpendicular to the direction of the shore. The yard area 20 comprises a plurality of yard units 203. Each yard unit 203 includes a first yard 204 and a second yard 205 arranged with an interval. The collection-evacuation passage comprises a plurality of collection-evacuation passage units 206. Each collection-evacuation passage unit 206 is U-shaped. Each collection-evacuation passage unit 206 is arranged in one yard unit 203 and surrounds the first yard 204. It should be noticed that, for the convenience of expression, the yard surrounded by the collection-evacuation passage unit 206 is referred to as the first yard 204, and the yard not surrounded by the collection-evacuation passage unit 206 is referred to as the second yard 205. In an actual arrangement, which yard shall be surrounded by the collection-evacuation passage unit may be determined according to actual demand. The collection-evacuation passage unit 206 occupies the entire interval between the first yard 204 and the second yard 205, a first end area of the first yard 204, and an area within the yard unit 203 and being a part of the side area of the first yard opposite to the second yard. The loading-unloading passage comprises an on-site loading-unloading passage 207 and a connection loading-unloading passage 208. The on-site loading-unloading passage 207 is arranged in the spacing areas between adjacent yard units 203 and occupies the spacing area between adjacent yard units 203. The connection loading-unloading passage is arranged between the yard area 20 and the shore working area 202. The connection loading-unloading passage may be divided into two parts, that is, the first connection loading-unloading passage and the second connection loading-unloading passage of the implementation shown in FIG. 1. Or, the connection loading-unloading passage may be integrated and disposed between the yard area and the shore working area 202. Each yard operation equipment in the yard area serves one yard, and an operation range of each yard operation equipment at least covers: the yard which is served, the nearest collection-evacuation passage unit, and the nearest on-site loading-unloading passage.

Figure 3:
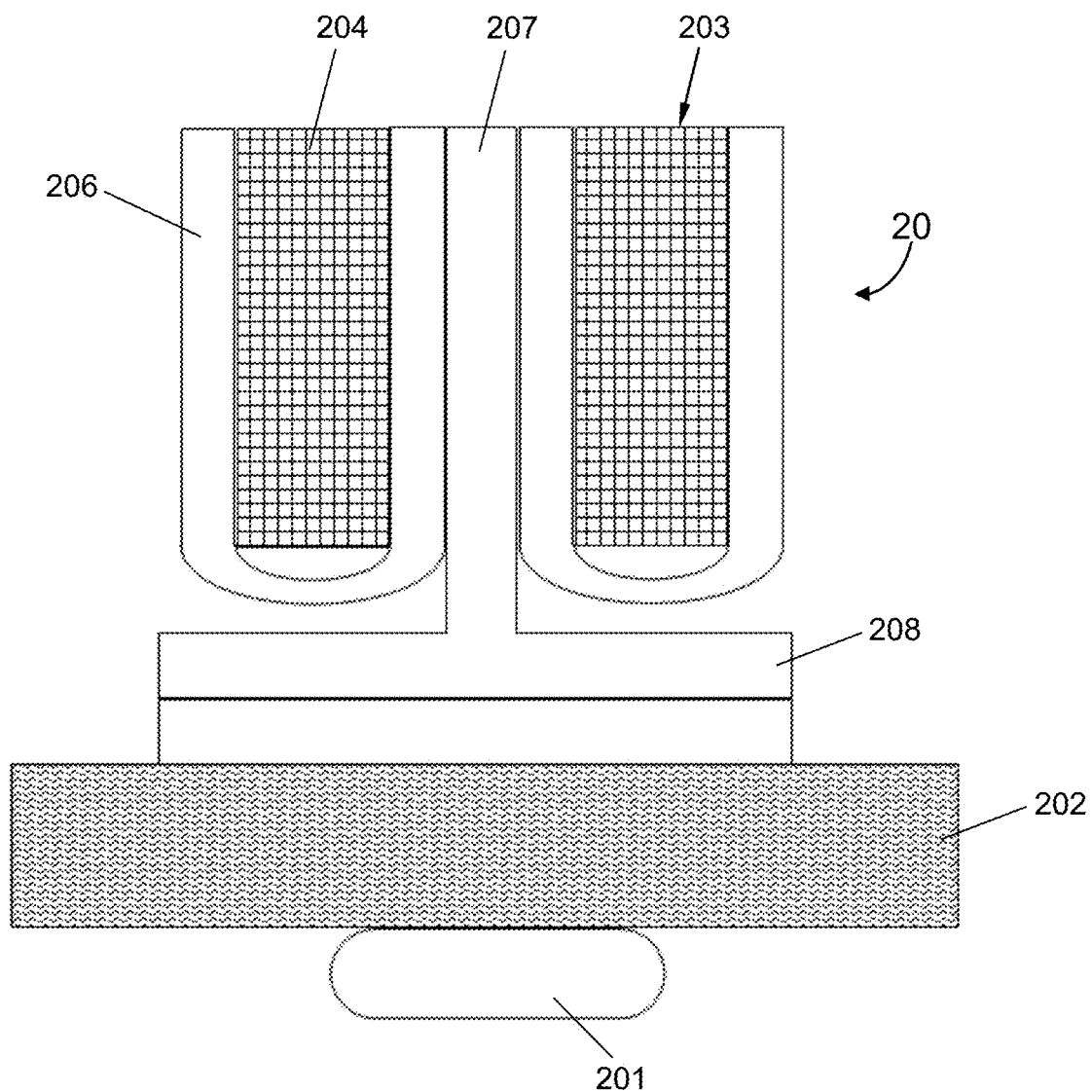
FIG. 3 discloses a schematic diagram of an arrangement of a container terminal according to a second embodiment of the present invention.

With reference to FIG. 3, FIG. 3 discloses a schematic diagram of an arrangement of a container terminal according to a second embodiment of the present invention. As shown in FIG. 3, according to the second embodiment, the shore working area 202 is arranged along the shore and a ship 201 is docked at the shore. The direction of the yard area 20 is perpendicular to the direction of the shore. Each yard unit 203 comprises a yard 204. The collection-evacuation passage comprises a plurality of collection-evacuation passage units 206. Each collection-evacuation passage unit 206 is U-shaped, each collection-evacuation passage unit 206 is arranged in one yard unit 203 and surrounds the yard 204. The collection-evacuation passage unit 206 occupies both side areas of the yard, and a first end area of the yard. The loading-unloading passage comprises an on-site loading-unloading passage 207 and a connection loading-unloading passage 208. The on-site loading-unloading passage 207 is arranged in the spacing areas between adjacent yard units 203 and occupies the spacing area between adjacent yard units 203. The connection loading-unloading passage is arranged between the yard area 20 and the shore working area 202. The connection loading-unloading passage may be divided into two parts, or, be integrated. Each yard operation equipment in the yard area serves one yard, and an operation range of each yard operation equipment at least covers: the yard which is served, the nearest collection-evacuation passage unit, and the nearest on-site loading-unloading passage.

Figure 4:
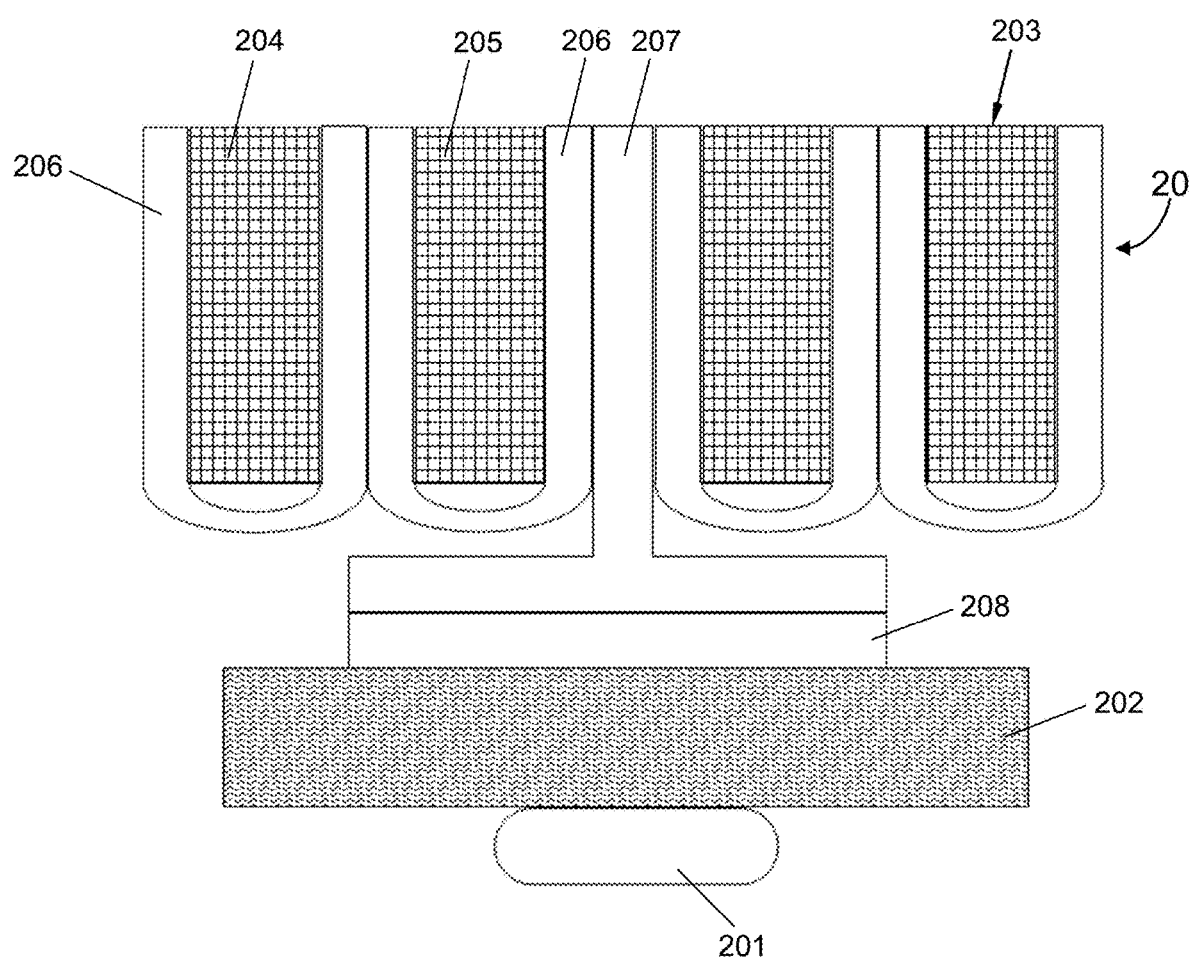
FIG. 4 discloses a schematic diagram of an arrangement of a container terminal according to a third embodiment of the present invention.

With reference to FIG. 4, FIG. 4 discloses a schematic diagram of an arrangement of a container terminal according to a third embodiment of the present invention. As shown in FIG. 4, according to the third embodiment, the shore working area 202 is arranged along the shore and a ship 201 is docked at the shore. The direction of the yard area 20 is perpendicular to the direction of the shore. Each yard unit 203 comprises a first yard 204 and a second yard 205 arranged with an interval. The collection-evacuation passage comprises a plurality of collection-evacuation passage units 206. Each collection-evacuation passage unit 206 is U-shaped. Two collection-evacuation passage units 206 are arranged in each yard unit. The two collection-evacuation passage units 206 surround the first yard 204 and the second yard 205 respectively. The collection-evacuation passage unit 206 surrounding the first yard 204 occupies a part of the interval between the first yard and the second yard, a first end area of the first yard, and an area within the yard unit and being a part of the side area of the first yard opposite to the second yard. The collection-evacuation passage unit surrounding the second yard 205 occupies a part of the interval between the first yard and the second yard, a first end area of the second yard, and an area within the yard unit and being a part of the side area of the second yard opposite to the first yard. As shown in FIG. 4, according to the third embodiment, within the yard unit 203, the interval between the first yard 204 and the second yard 205 is divided into two parts, which are respectively occupied by the collection-evacuation passage units 206 on both sides. The loading-unloading passage comprises an on-site loading-unloading passage 207 and a connection loading-unloading passage 208. The on-site loading-unloading passage 207 is arranged in the spacing areas between adjacent yard units 203 and occupies the spacing area between adjacent yard units 203. The connection loading-unloading passage is arranged between the yard area 20 and the shore working area 202. The connection loading-unloading passage may be divided into two parts, or, be integrated. Each yard operation equipment in the yard area serves one yard, and an operation range of each yard operation equipment at least covers: the yard which is served, the nearest collection-evacuation passage unit, and the nearest on-site loading-unloading passage.

Figure 5:
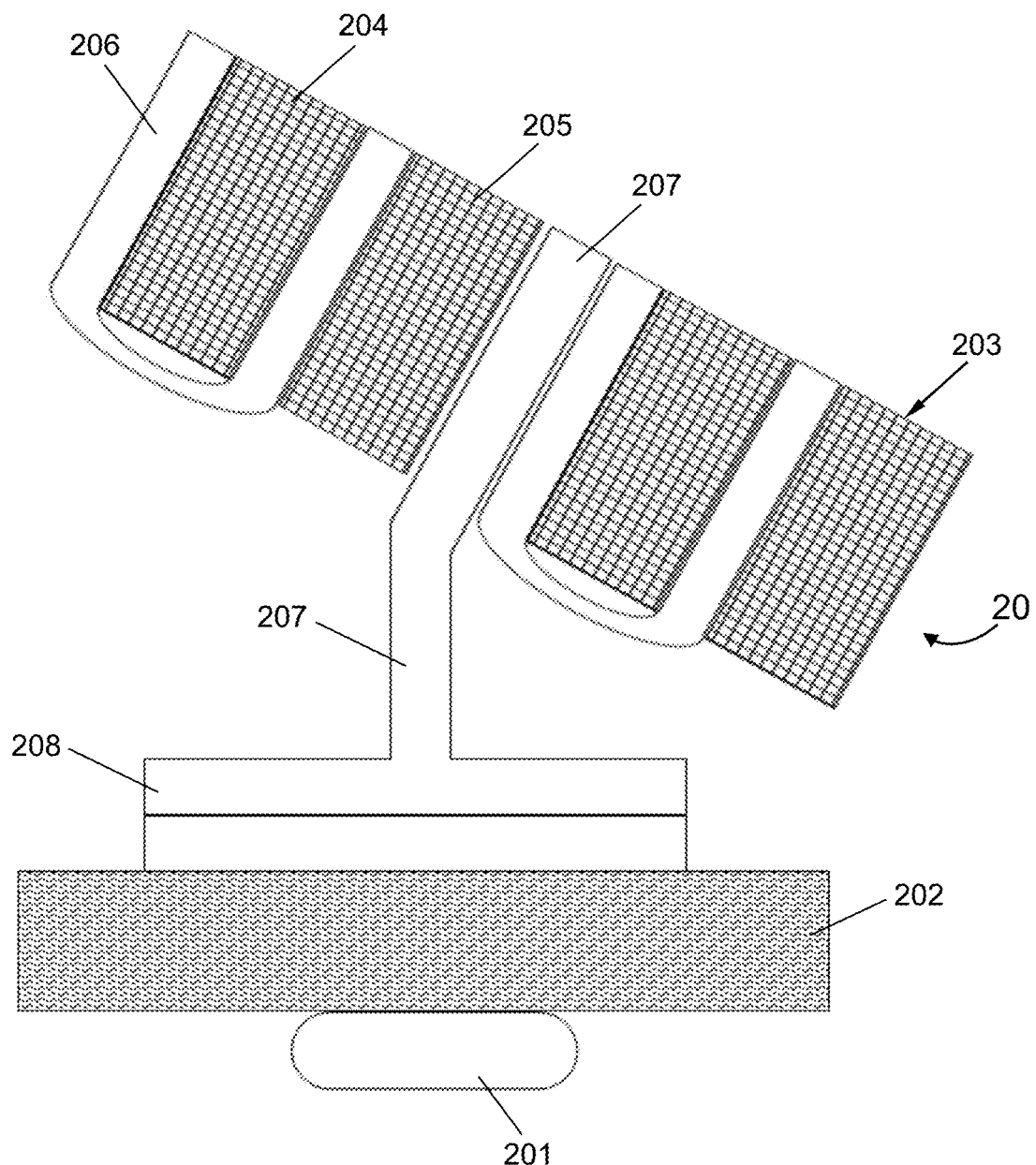
FIG. 5 discloses a schematic diagram of an arrangement of a container terminal according to a fourth embodiment of the present invention.

With reference to FIG. 5, FIG. 5 discloses a schematic diagram of an arrangement of a container terminal according to a fourth embodiment of the present invention. As shown in FIG. 5, according to the fourth embodiment, the shore working area 202 is arranged along the shore and a ship 201 is docked at the shore. The direction of the yard is at an angle to the direction of the shore, which is between 0~180 degrees. In the aforementioned first to third embodiments, the direction of the yard is perpendicular to the direction of the shore, or at an angle of 90 degrees. According to the fourth embodiment, the yard is inclined with respect to the shore, that is to say at an angle between 0~180 degrees. The internal structure of the yard and the structure of the collection-evacuation passage according to the fourth embodiment are similar to those of the first embodiment: the yard area 20 comprises a plurality of yard units 203. Each yard unit 203 includes a first yard 204 and a second yard 205 arranged with an interval. The collection-evacuation passage comprises a plurality of collection-evacuation passage units 206. Each collection-evacuation passage unit 206 is U-shaped. Each collection-evacuation passage unit 206 is arranged in one yard unit 203 and surrounds the first yard 204. It should be noticed that, the internal structure of the yard and the structure of the collection-evacuation passage according to the third or fourth embodiment as shown in FIG. 3 or FIG. 4 may also be inclined. The loading-unloading passage comprises an on-site loading-unloading passage 207 and a connection loading-unloading passage 208. The on-site loading-unloading passage 207 is arranged in the spacing areas between adjacent yard units 203 and occupies the spacing area between adjacent yard units 203. The connection loading-unloading passage is arranged between the yard area 20 and the shore working area 202. The connection loading-unloading passage may be divided into two parts, or, be integrated. Each yard operation equipment in the yard area serves one yard, and an operation range of each yard operation equipment at least covers: the yard which is served, the nearest collection-evacuation passage unit, and the nearest on-site loading-unloading passage.

Figure 6:
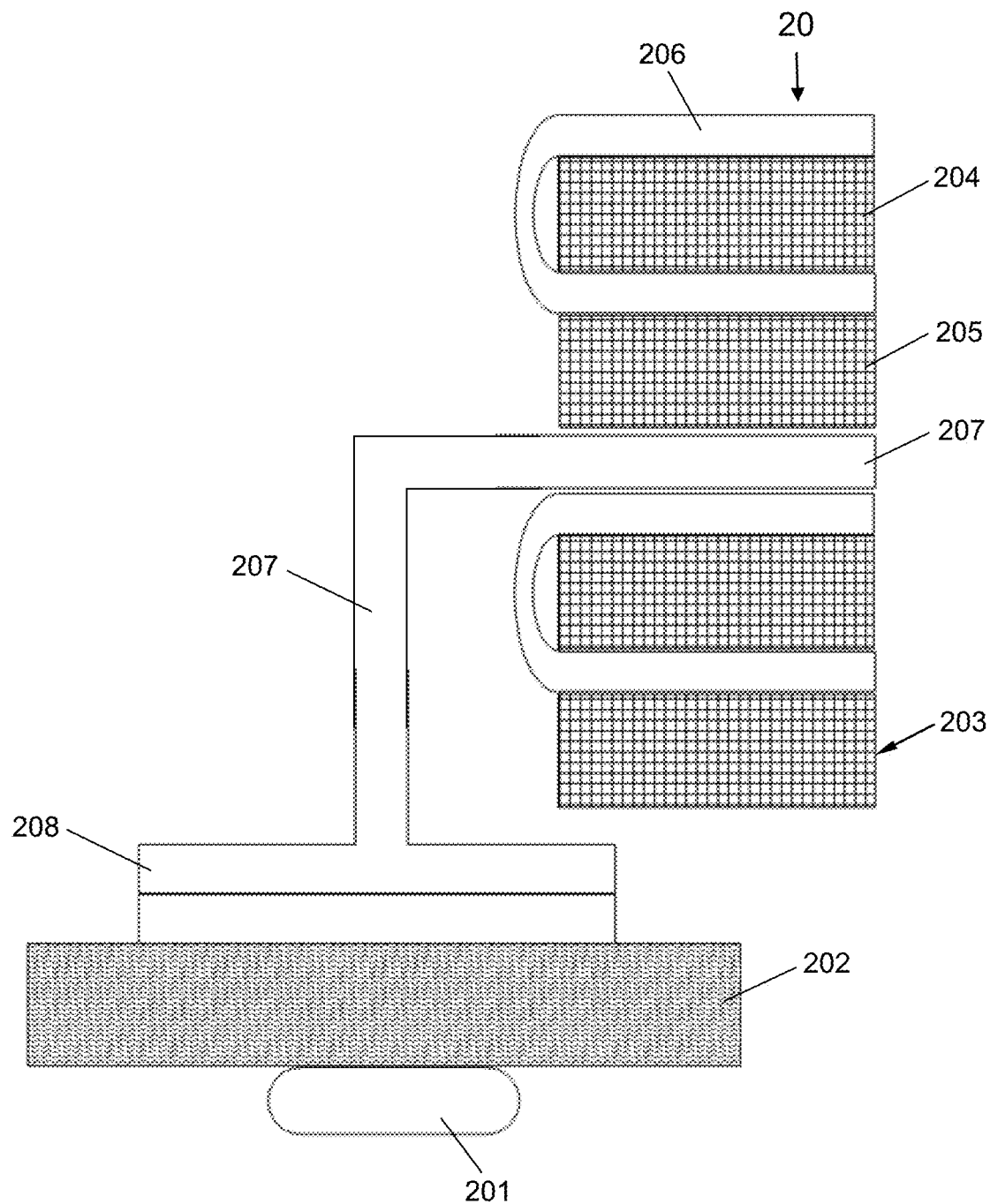
FIG. 6 discloses a schematic diagram of an arrangement of a container terminal according to a fifth embodiment of the present invention.

With reference to FIG. 6, FIG. 6 discloses a schematic diagram of an arrangement of a container terminal according to a fifth embodiment of the present invention. As shown in FIG. 6, according to the fifth embodiment, the shore working area 202 is arranged along the shore and a ship 201 is docked at the shore. The direction of the yard is parallel to the direction of the shore, in other words, be 0 degree or 180 degrees to the shore. The internal structure of the yard and the structure of the collection-evacuation passage according to the fifth embodiment are similar to those of the first embodiment: the yard area 20 comprises a plurality of yard units 203. Each yard unit 203 includes a first yard 204 and a second yard 205 arranged with an interval. The collection-evacuation passage comprises a plurality of collection-evacuation passage units 206. Each collection-evacuation passage unit 206 is U-shaped. Each collection-evacuation passage unit 206 is arranged in one yard unit 203 and surrounds the first yard 204. It should be noticed that, the internal structure of the yard and the structure of the collection-evacuation passage according to the third or fourth embodiment as shown in FIG. 3 or FIG. 4 may also be parallel to the shore. The loading-unloading passage comprises an on-site loading-unloading passage 207 and a connection loading-unloading passage 208. The on-site loading-unloading passage 207 is arranged in the spacing areas between adjacent yard units 203 and occupies the spacing area between adjacent yard units 203. The connection loading-unloading passage is arranged between the yard area 20 and the shore working area 202. The connection loading-unloading passage may be divided into two parts, or, be integrated. Each yard operation equipment in the yard area serves one yard, and an operation range of each yard operation equipment at least covers: the yard which is served, the nearest collection-evacuation passage unit, and the nearest on-site loading-unloading passage.

According to the container terminal shown in FIG. 1, a container loading method for loading a container from a yard area to a ship is as follows:

The yard operation equipment 109 transports a container from the yard area to a loading-unloading transportation vehicle 102 on an on-site loading-unloading passage 115 in the yard area. When the yard operation equipment 109 is operating, the container is placed on the loading-unloading transportation vehicle 102 and the loading-unloading transportation vehicle 102 is in the working position. The loading-unloading transportation vehicle 102 travels on the roadway when running along the on-site loading-unloading passage.

The loading-unloading transportation vehicle 102 runs along the on-site loading-unloading passage 115 and a connection loading-unloading passage including a first connection loading-unloading passage 104 and a second connection loading-unloading passage 105, and arrives at a shore loading-unloading passage 103. The loading-unloading transportation vehicle 102 never enters into a collection-evacuation passage.

The shore operation equipment 101 loads the container from the loading-unloading transportation vehicle 102 on the shore loading-unloading passage 103 to the ship 100.

According to the container terminal shown in FIG. 1, a container unloading method for unloading a container from a ship to a yard area is as follows:

The shore operation equipment 101 unloads a container from the ship 100 to a loading-unloading transportation vehicle 102 on the shore loading-unloading passage 103.

The loading-unloading transportation vehicle 102 runs from the shore loading-unloading passage 103 to an on-site loading-unloading passage 115 along a connection loading-unloading passage including a first connection loading-unloading passage 104 and a second connection loading-unloading passage 105. The loading-unloading transportation vehicle 102 never enters into a collection-evacuation passage.

The yard operation equipment 109 stacks the container from the loading-unloading transportation vehicle 102 on the on-site loading-unloading passage 115 to the yard area. When the yard operation equipment 109 is operating, the container is stacked from the loading-unloading transportation vehicle 102 and the loading-unloading transportation vehicle 102 is in the working position. The loading-unloading transportation vehicle 102 travels on the roadway when running along the on-site loading-unloading passage.

According to the container terminal shown in FIG. 1, a container evacuation method for evacuating a container from a yard area is as follows:

The yard operation equipment 109 transports a container from the yard area to a collection-evacuation vehicle 111 on a collection-evacuation passage. When the yard operation equipment 109 is operating, the collection-evacuation vehicle 111 is in the working position. The collection-evacuation vehicle 111 travels on the roadway when running along the collection-evacuation passage.

The collection-evacuation vehicle 111 runs away from the yard area along the collection-evacuation passage. The collection-evacuation vehicle 111 never enters into a loading-unloading passage.

According to the container terminal shown in FIG. 1, a container collection method for collecting a container to a yard area is as follows:

The collection-evacuation vehicle 111 runs to the yard area along a collection-evacuation passage. The collection-evacuation vehicle 111 never enters into a loading-unloading passage.

The yard operation equipment 109 stacks the container from the loading-unloading transportation vehicle 111 on the collection-evacuation passage to the yard area. When the yard operation equipment 109 is operating, the collection-evacuation vehicle 111 is in the working position. The collection-evacuation vehicle 111 travels on the roadway when running along the collection-evacuation passage.

The container terminal, the container loading-unloading method and the container collection-evacuation method of the present invention still arrange the loading-unloading transportation vehicles and the collection-evacuation vehicles in a same horizontal plane, but their running paths are separated and will not intersect each other during running processes. According to the present invention, it is not required to construct viaducts, so it has a lower cost and a better scalability.

The above embodiments are provided to those skilled in the art to realize or use the invention, under the condition that various modifications or changes being made by those skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. A container terminal comprising:
    a shore working area, loading-unloading passages, a yard area and collection-evacuation passages, wherein shore operation equipments are arranged in the shore working area, yard operation equipments are arranged in the yard area, loading-unloading transportation vehicles run on the loading-unloading passages and collection-evacuation vehicles run on the collection-evacuation passages, the shore operation equipments perform loading-unloading operations of containers with a ship, the loading-unloading transportation vehicles transport the containers between the shore working area and the yard area, the collection-evacuation vehicles perform collection or evacuation transportations for the containers disposed in the yard area,
    wherein the shore working area is arranged on a shore and the ship is docked at the shore;
    wherein the yard area comprises a plurality of yard units, spacing areas are formed between adjacent yard units, the loading-unloading passages are arranged in the spacing areas between adjacent yard units;
    wherein the loading-unloading passages connect the yard area and the shore working area, the collection-evacuation passages are arranged in the yard units, the loading-unloading passages and the collection-evacuation passages are in a same horizontal plane but do not intersect with each other; and
    wherein each yard unit comprises a first yard and a second yard arranged with an interval, the collection-evacuation passage comprises a plurality of collection-evacuation passage units, each collection-evacuation passage unit is U-shaped, each collection-evacuation passage unit is arranged in one yard unit and surrounds the first yard, the collection-evacuation passage unit occupies the interval between the first yard and the second yard, a first end area of the first yard, and an area within the yard unit and being a part of the side area of the first yard opposite to the second yard.

2. The container terminal according to claim 1, wherein the loading-unloading passage comprises a plurality of on-site loading-unloading passages and connection loading-unloading passages;
    the connection loading-unloading passages are arranged between the yard area and the shore working area; and
    the on-site loading-unloading passages are arranged in the spacing areas between adjacent yard units, but do not enter into a single yard unit.

3. The container terminal according to claim 2, wherein each yard operation equipment serves one yard, and an operation range of each yard operation equipment at least covers:
    the yard which is served, the nearest collection-evacuation passage unit, and the nearest on-site loading-unloading passage.

4. The container terminal according to claim 2, wherein the shore working area comprises shore loading-unloading passages, the shore loading-unloading passages are located proximate landside operation areas of the shore operation equipments; and
    the connection loading-unloading passage comprises a first connection loading-unloading passage and a second connection loading-unloading passage, the plurality of on-site loading-unloading passages are connected with the first connection loading-unloading passage, the second connection loading-unloading passage connects the first connection loading-unloading passage and the shore loading-unloading passage.

5. The container terminal according to claim 1, wherein the direction of the yard area and the yard units therein is at an angle to the shore, and the angle is between 0 and 180 degrees.

6. A container loading method for loading a container from a yard area to a ship on the container terminal according to claim 1, comprising:
    transporting, by a yard operation equipment, a container from the yard area to a loading-unloading transportation vehicle on an on-site loading-unloading passage in the yard area;
    the loading-unloading transportation vehicle running along the on-site loading-unloading passage, a connection loading-unloading passage and arriving a shore loading-unloading passage, wherein the loading-unloading transportation vehicle never enters into a collection-evacuation passage; and
    loading, by a shore operation equipment, the container from the loading-unloading transportation vehicle to the ship.

7. A container unloading method for unloading a container from a ship to a yard area on the container terminal according to claim 1, comprising:

unloading, by a shore operation equipment, a container from the ship to a loading-unloading transportation vehicle;

the loading-unloading transportation vehicle running along a shore loading-unloading passage, a connection loading-unloading passage and arriving an on-site loading-unloading passage, wherein the loading-unloading transportation vehicle never enters into a collection-evacuation passage; and stacking, by a yard operation equipment, the container from the loading-unloading transportation vehicle to the yard area.

8. A container evacuation method for evacuating a container from a yard area on the container terminal according to claim 1, comprising:

transporting, by a yard operation equipment, a container from the yard area to a collection-evacuation vehicle on a collection-evacuation passage; and the collection-evacuation vehicle running away from the yard area along the collection-evacuation passage, wherein the collection-evacuation vehicle never enters into a loading-unloading passage.

9. A container collection method for collecting a container to a yard area on the container terminal according to claim 1, comprising:

a collection-evacuation vehicle running to the yard area along a collection-evacuation passage, wherein the collection-evacuation vehicle never enters into a loading-unloading passage; and stacking, by a yard operation equipment, the container from the collection-evacuation vehicle to the yard area.

* * * * *